United States Patent [19]

Braun

[11] Patent Number: 5,394,763
[45] Date of Patent: Mar. 7, 1995

[54] AUXILIARY TRANSMISSION SECTION

[75] Inventor: Eugene R. Braun, Royal Oak, Mich.

[73] Assignee: Eaton Corproation, Cleveland, Ohio

[21] Appl. No.: 55,192

[22] Filed: Apr. 28, 1993

[51] Int. Cl.⁶ ............................................. F16H 3/02
[52] U.S. Cl. .................................... 74/331; 74/745
[58] Field of Search ............... 74/745, 331, 325, 344, 74/345

[56] References Cited

U.S. PATENT DOCUMENTS

| | | |
|---|---|---|
| 2,637,221 | 5/1953 | Backus et al. . |
| 2,637,222 | 5/1953 | Backus . |
| 3,105,395 | 10/1963 | Perkins . |
| 3,283,613 | 11/1966 | Perkins . |
| 3,648,546 | 3/1972 | McNamara et al. . |
| 3,799,002 | 3/1974 | Richards . |
| 3,802,293 | 4/1974 | Winckler et al. ............ 74/331 |
| 4,290,515 | 9/1981 | Bogema et al. . |
| 4,440,037 | 4/1984 | Foxton et al. . |
| 4,527,447 | 7/1985 | Richards . |
| 4,754,665 | 7/1988 | Vandervoort . |
| 4,964,313 | 10/1990 | Davis ............................. 74/331 |
| 4,966,048 | 10/1990 | Braun ............................ 74/745 |
| 5,000,060 | 3/1991 | Reynolds et al. ............. 74/331 |

FOREIGN PATENT DOCUMENTS 278339  12/1987  Japan ..................... 74/745

OTHER PUBLICATIONS

Small Scale Print No. 016-AD; Fuller Transmission; Models RT-14613, RTO-14613, RTOO-14613, Mar. 1981 by Eaton Corporation.

*Primary Examiner*—John T. Kwon
*Assistant Examiner*—James A. Larson
*Attorney, Agent, or Firm*—Brooks & Kushman

[57] ABSTRACT

An auxiliary transmission section for a compound change gear transmission includes a mainshaft input gear rotationally fixed to an auxiliary section input shaft, a mainshaft splitter gear coaxial with and rotatable relative to the auxiliary section input shaft, an output shaft range gear coaxial with and rotatable relative to the output shaft, an auxiliary section countershaft assembly having an auxiliary countershaft, a countershaft splitter gear coaxial with and rotatable relative to the auxiliary countershaft and constantly meshed with the mainshaft input gear, a first auxiliary countershaft gear rotationally fixed to the auxiliary countershaft and constantly meshed with the mainshaft splitter gear, and a second auxiliary countershaft gear rotationally fixed to the auxiliary countershaft and constantly meshed with the output shaft range gear, a first one-position splitter clutch for coupling the mainshaft splitter gear with the auxiliary section input shaft, a second one-position splitter clutch for coupling the countershaft splitter gear with the auxiliary section countershaft, and a controller for alternatively positioning the clutch assemblies.

4 Claims, 4 Drawing Sheets

AUXILIARY TRANSMISSION SECTION

TECHNICAL FIELD

The present invention relates to an auxiliary transmission section for a compound transmission and, more particularly, to an improved auxiliary transmission section including a countershaft clutch arrangement.

BACKGROUND ART

Compound change gear transmissions of the type having one or more auxiliary sections connected in series with a main transmission section are well known in the prior art. Briefly, by utilizing main and auxiliary transmission sections connected in series, assuming proper sizing of the ratio steps, the total of available transmission ratios is equal to the product of the main and auxiliary section ratios. By way of example, at least in theory, a compound change gear transmission comprising a four (4) speed main section connected in series with a three (3) speed auxiliary section will provide twelve (4×3=12) available ratios.

Auxiliary transmission sections are of three general types: range type, splitter type or combined range/splitter type.

In compound transmissions having a range type auxiliary section, the ratio step or steps may be greater, equal or less than the total ratio coverage of the main transmission section and the main section is shifted progressively through its ratios in each range. Examples of compound transmissions having range type auxiliary sections may be seen by reference to U.S. Pat. Nos. 3,105,395; 2,637,222 and 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. Nos. 4,290,515; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference and to publication Small Scale Print No. 016-AD; Fuller Transmissions; Models RT-14613, RTO-14613, RTOO-14613, published March 1981 by Eaton Corporation, assignee of this invention, the disclosure of which is hereby incorporated by reference. Another example is the "Ecosplit" model of transmission sold by Zahnradfabrik Friedrichshafen Aktiengeseushaft of Friedrichshafen, Federal Republic of Germany which utilizes a separate splitter auxiliary section in front of, and a separate range auxiliary section behind, the main transmission section.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

A conventional auxiliary transmission section such as that disclosed in U.S. Pat. No. 4,754,665 includes an auxiliary section input shaft and an output shaft cooperably forming a mainshaft assembly, and an auxiliary countershaft assembly. A two-way clutch is provided on the mainshaft assembly and clutching occurs on the mainshaft to drive the countershaft assembly.

DISCLOSURE OF INVENTION

Accordingly, an object of the present invention is to provide a new and improved auxiliary transmission section wherein an auxiliary countershaft is drivable through engagement with a mainshaft or countershaft.

Another object of the present invention is to provide a new and improved three-layer, four-speed auxiliary transmission section of the range and splitter type for a compound change gear transmission which has a simpler and less costly mounting of the center layer input gear.

A further object of the present invention is to provide a new and improved auxiliary transmission section of the combined range/splitter type having a shorter length through the use of one engaged position splitter clutch assembly on the input shaft and a second one engaged position clutch assembly on the countershaft.

In carrying out the above objects, the improved auxiliary transmission section is a combined range/splitter type auxiliary transmission section for a compound change gear transmission comprising an auxiliary transmission section. The auxiliary transmission section comprises a housing, an auxiliary section input shaft extending into the housing and driven by the main transmission section and an output shaft extending from the housing. The auxiliary transmission section is characterized by a mainshaft input gear rotationally fixed to the auxiliary section input shaft, a mainshaft splitter gear coaxial with and rotatable relative to the auxiliary section input shaft, and an output shaft range gear coaxial with and rotatable relative to said output shaft.

The auxiliary transmission section also comprises an auxiliary section countershaft assembly including an auxiliary countershaft rotationally supported in the housing, a countershaft splitter gear coaxial with and rotatable relative to the auxiliary countershaft and constantly meshed with the mainshaft input gear, a first auxiliary countershaft gear rotationally fixed to the auxiliary countershaft and constantly meshed with the mainshaft splitter gear, and a second auxiliary countershaft gear rotationally fixed to the auxiliary countershaft and constantly meshed with the output shaft range gear. A first one engaged position splitter clutch assembly is fixed for rotation with the auxiliary section input shaft for coupling said mainshaft splitter gear with the auxiliary section input shaft and a second one engaged position splitter clutch assembly is fixed for rotation with the auxiliary section countershaft for coupling the countershaft splitter gear with the auxiliary section countershaft and a control means for alternatively positioning one of the clutch assemblies for alternatively positioning one of said clutch assemblies for engagement thereof to establish a torque flow path from the auxiliary section input shaft to the output shaft.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
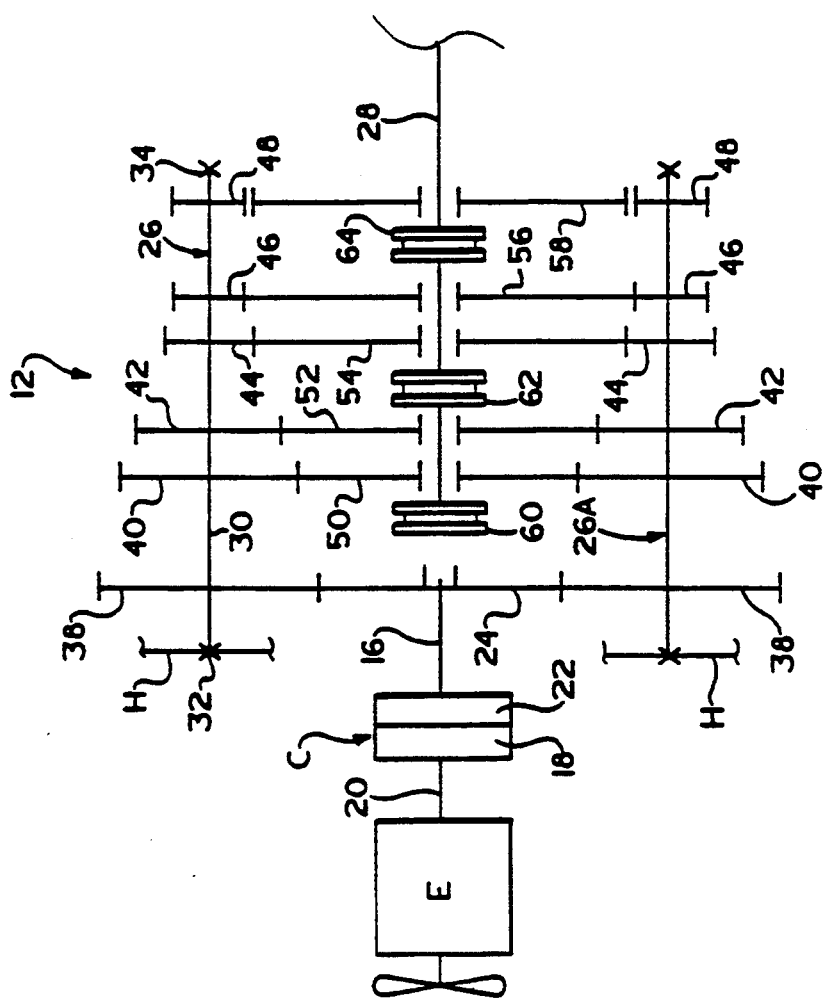
FIG. 1 is a schematic illustration of a prior art main transmission section of a compound transmission.

Certain terminology will be used in the following description for convenience only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in the vehicle, being respectively to the left and right sides of the prior art main transmission section illustrated in FIG. 1.

The term "compound transmission" is used to designate a change speed or change gear transmission having a main transmission section and an auxiliary transmission section connected in series whereby the selected gear reduction in the main transmission section may be compounded by further selected gear reduction in the auxiliary transmission section. The term "upshift" as used herein shall mean the speed gear ratio is changed from a lower value to a higher value. The term "downshift" as used herein shall means the shifting from a higher speed gear ratio to a lower speed gear ratio. The terms "low speed gear" or "low gear" as used herein shall designate a gear ratio utilized for relatively lower forward speed operation in a transmission, i.e. a set of gears having a higher ratio of reduction of output shaft speed relative to the speed of the input shaft. "Synchronized clutch assembly" and words of similar import shall designate a clutch assembly utilized to non-rotatably couple a selected gear to a shaft by means of a positive clutch in which attempted engagement of said clutch is prevented until the members of the clutch are at substantially synchronous rotation and relative large capacity friction means are associated with the clutch members and are sufficient, upon initiation of a clutch engagement, to cause the clutch members and all members rotating therewith to rotate at a substantially synchronous speed.

The auxiliary transmission section 10 hereinafter disclosed is used in combination with a main transmission section 12 to provide a compound transmission.

One example of a main transmission section 12 is hereinafter disclosed for purposes of describing the auxiliary transmission 10. Other types of main transmission sections can be connected up to the auxiliary transmission section 10.

With reference to FIG. 1, a prior art main transmission section is schematically illustrated. Typically, the auxiliary transmission section 10 and main transmission section 12 are housed within a single housing. Main transmission section 12 includes an input shaft 16 driven by a prime mover such as diesel engine E through a selectively disengaged, normally engaged friction master clutch C having an input or driving section 18 drivingly connected to the engine crankshaft 20 and a driven portion 22 rotatably fixed to the transmission input shaft 16.

In the main transmission section 12, the input shaft 16 carries an input gear 24 for simultaneously driving a plurality of substantially identical main section countershaft assemblies 26 and 26a at substantially identical rotational speeds. In the transmission 10 illustrated, two substantially identical main section countershaft assemblies are provided on diametrically opposite sides of a mainshaft 28, which mainshaft is generally coaxially aligned with the input shaft 16. Each of the main section countershaft assemblies 26 and 26a comprises a main section countershaft 30 supported by bearings 32 and 34 in housing H, only a portion of which is schematically illustrated.

Each of the main section countershafts 30 is provided with an identical grouping of main section countershaft gears 38, 40, 42, 44, 46 and 48, fixed for rotation therewith. A plurality of main section drive or mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the art. Clutch collar 60 may also be utilized to clutch input gear 24 to mainshaft 28 to provide a direct drive relationship between input shaft 16 and mainshaft 28. Preferably, each of the main section mainshaft gears encircles the mainshaft 28 and is in continuous meshing engagement with and is floatingly supported by the associated countershaft gear group.

Typically, clutch collars 60, 62 and 64 are axially positioned by means of shift forks (not illustrated) associated with a shift bar housing assembly (not illustrated) as well known in the prior art. Clutch collars 60, 62 and 64 are of the well known non-synchronized double acting jaw clutch type.

With continued reference to FIG. 1, main section mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio namely, that ratio provided by drivingly connected mainshaft drive gear 56 to mainshaft 28 is often of such a high gear reduction as to be considered a low or "creeper" gear which is utilized only for starting of a vehicle under severe conditions and is usually not utilized in the high transmission range and/or may not be split in the low transmission range.

Jaw clutches 60, 62 and 64 are three-position clutches in that they may be positioned in a centered, non-engaged position as illustrated or in a fully rightwardly engaged or fully leftwardly engaged position.

Figure 2:
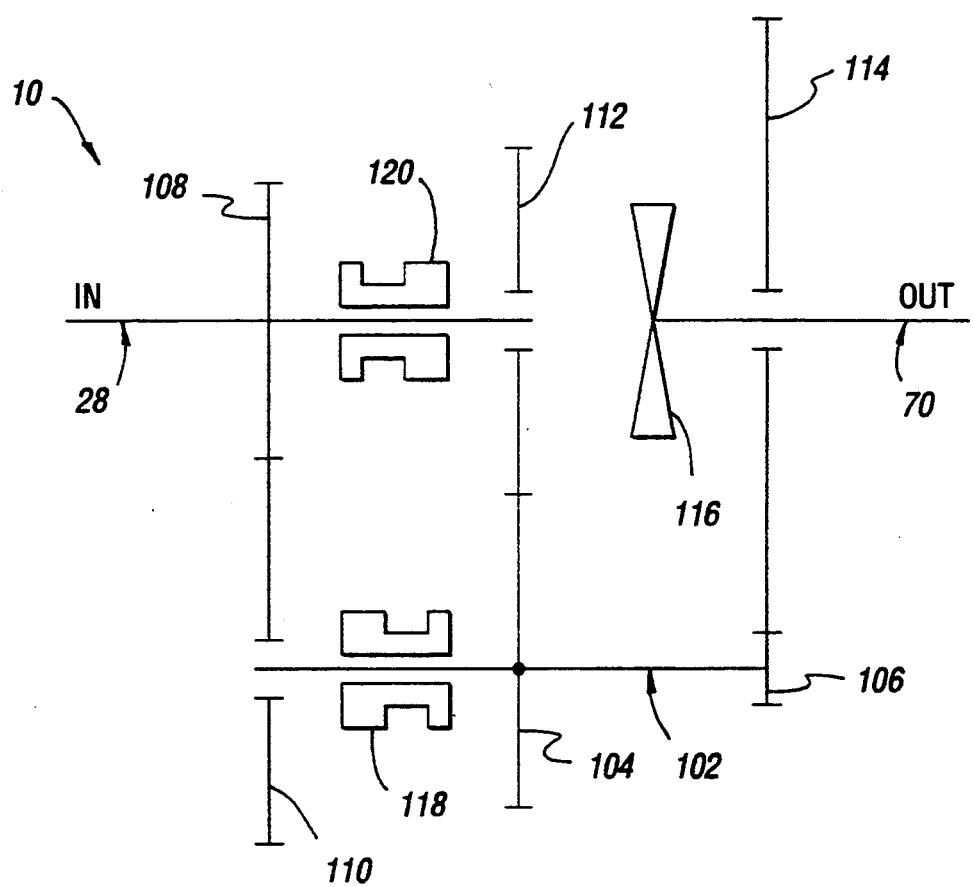
FIG. 2 is a schematic illustration of an auxiliary transmission section constructed in accordance with the present invention for coupling with a main transmission section of a compound transmission.

Referring now to FIG. 2, auxiliary transmission section 10 is described with reference to main transmission section 12 although the auxiliary transmission section described can be utilized with other type main transmission sections. Auxiliary transmission section 10 includes an auxiliary countershaft 102 carrying two auxiliary section countershaft gears 104,106 fixed for rotation therewith. A mainshaft gear 108 is constantly meshed with and supports a splitter gear 110 which surrounds countershaft 102. Auxiliary countershaft gear 104 is constantly meshed with and supports auxiliary section splitter gear 112 which surrounds mainshaft 28. Auxiliary countershaft gear 106 is constantly meshed with and supports auxiliary section range gear 114 which surrounds output shaft 70. A two-way synchronizer assembly 116 is utilized to couple splitter gear 114 to output shaft 70.

A sliding one position jaw clutch collar 118 is utilized to selectively couple splitter gear 110 to the auxiliary countershaft 102 to establish a first torque flow path between mainshaft 28 and output shaft 70. Alternatively, a sliding one position jaw clutch collar 120 is utilized to selectively couple splitter gear 112 to the mainshaft 28 to establish a second torque flow path between the mainshaft and output shaft 70. Many of the well known synchronized positive clutch structures are suitable for use in the auxiliary transmission section of the present invention.

With continued reference to FIG. 2, by selectively axially positioning both jaw clutch collars 118,120 in the forward and rearward axial positions thereof, four distinct ratios of mainshaft rotation to output shaft rotation may be provided. For example,

| RATIO SPLITTER | RATIO RANGE | CLUTCH 118 | CLUTCH 120 | SYNCHRONIZER 116 |
|---|---|---|---|---|
| OD | LO | ENGAGED | DISENG | REARWARD |
| DIR | LO | DISENG | ENGAGED | REARWARD |
| OD | HI | ENGAGED | DISENG | FORWARD |
| DIR | HI | DISENG | ENGAGED | FORWARD |

Accordingly, auxiliary transmission section 10 is a 3-layer auxiliary section of the combined range and splitter type providing four selectable speeds or drive ratios between the input (shaft 28) and output (output shaft 70) thereof. In the compound transmission described, the main section 12 provides a reverse and five potentially selectable forward speeds. However, one of these selectable forward gear ratios (gear 56) is often a creeper or low gear not intended to be used in the high range. Thus, the compound transmission is properly designated as a (4+1)×(2)×(2) type transmission providing 17 or 18 selectable forward speeds depending upon the desirability and/or practicality of splitting the low or creeper gear.

Figure 3:
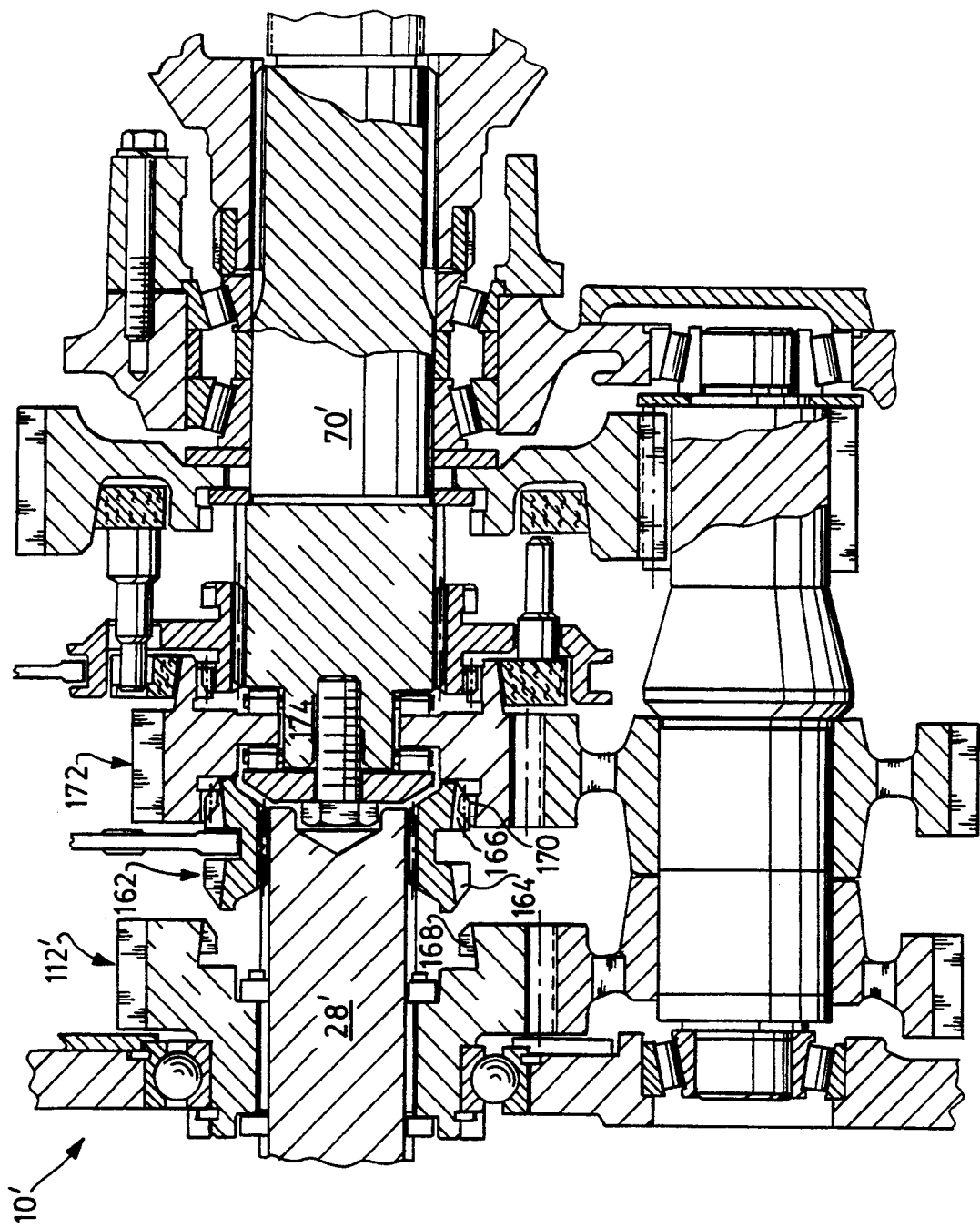
FIG. 3 is a partial assembly cross-sectional view of a prior art three-layer combined range/splitter type auxiliary transmission section.
Figure 4:
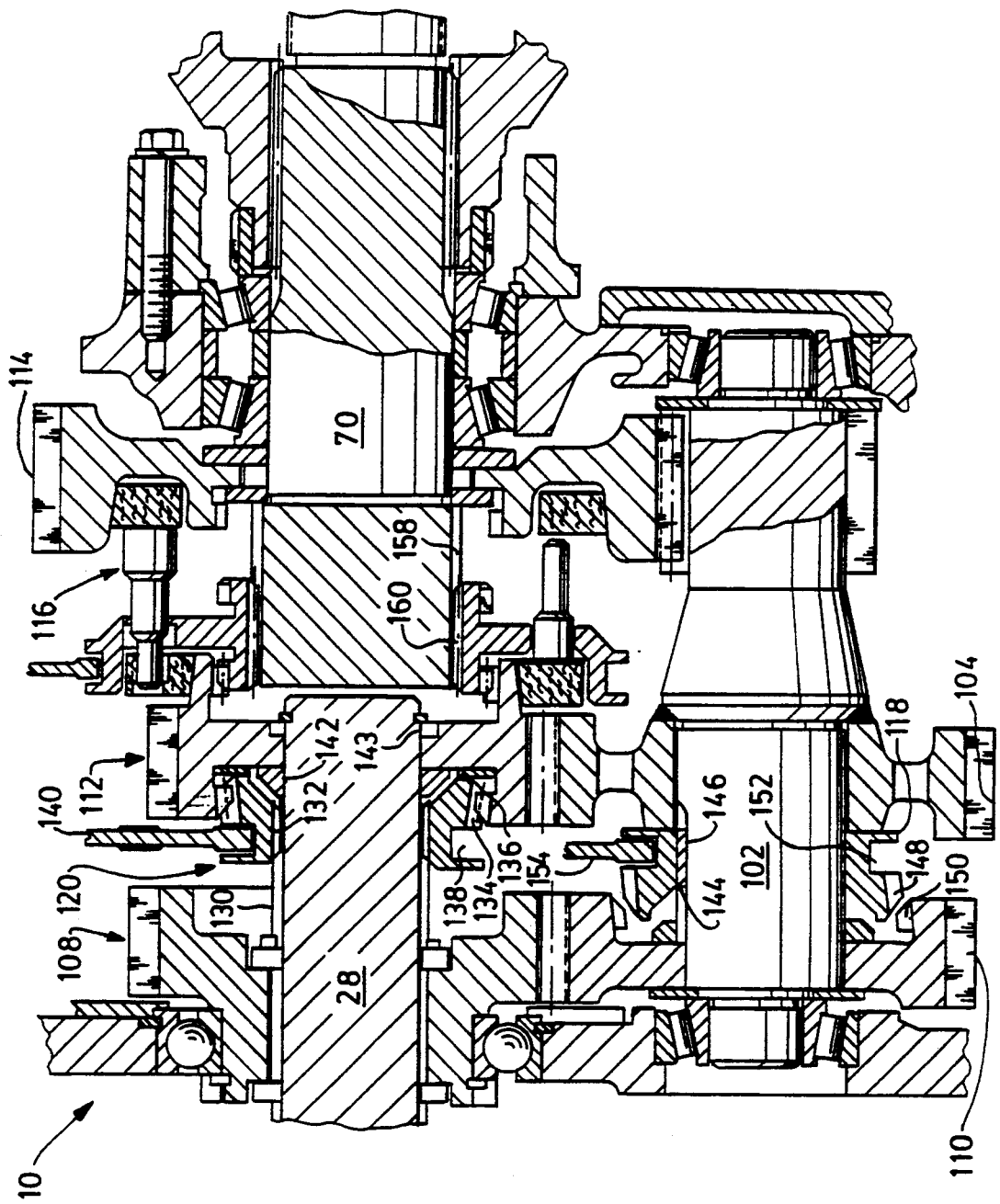
FIG. 4 is a partial assembly cross-sectional view of one embodiment of an auxiliary transmission section constructed in accordance with the present invention illustrating a shorter combined range/splitter type auxiliary transmission section with simpler, lower cost center layer gear mounting on the input shaft.

The detailed structure of the preferred embodiment of auxiliary transmission section 10 is illustrated in FIG. 4. A prior art auxiliary section 10′ is illustrated in FIG. 3. In the description that follows, like reference numerals will be used to identify like structure in both auxiliary transmissions 10, 10′.

Referring to FIG. 4, the rearward end of mainshaft 28 extends into the auxiliary transmission section 10 and is provided with external splines 130 which mate with internal splines 132 on clutch collar 120 for rotationally coupling clutch collar 120 to the mainshaft 28 while allowing relative axial movement therebetween. The clutch collar 120 is provided with clutch teeth 134 for selective axial engagement with clutch teeth 136 provided on gear 112. The clutch collar 120 is also provided with a groove 138 for receipt of a shift fork 140. Gear 112 surrounds mainshaft 28 and is normally free to rotate relative thereto and is axially retained relative to the mainshaft 28 by means of retainers 142 and 143. Gear 112 is in continuous meshing engagement with gear 104 which is fixed for rotation with countershaft 102. Countershaft 102 is provided with external splines 144 which mate with internal splines 146 provided in clutch collar 118 for rotationally coupling clutch collar 118 to the countershaft 102 while allowing relative axial movement therebetween. The clutch collar 118 is provided with clutch teeth 148 for selective axial engagement with clutch teeth 150 provided on gear 110. The clutch collar 118 is also provided with a groove 152 for receipt of a shift fork 154.

Gear 110 surrounds countershaft 102 and is normally free to rotate relative thereto. Gear 110 is in continuous meshing engagement with gear 108 which is fixed for rotation with mainshaft 28.

Located axially between gears 108 and 114, and rotationally fixed to output shaft 70 by means of external splines 158 and internal splines 160, is the double-acting two position synchronized clutch assembly 116. Many of the well known synchronized positive clutch structures are suitable for use in the auxiliary transmission section 10 of the present invention. Synchronized clutch assembly 116 illustrated is of the pin type described in U.S. Pat. No. 4,462,489.

The prior art auxiliary transmission section 10′ of FIG. 3 is described in detail in U.S. Pat. No. 4,754,665 assigned to the assignee of the present invention. With reference to FIG. 3 herein, the auxiliary section 10′ includes a single clutch collar 162 provided with clutch teeth 164 and 166 for selective axial engagement with clutch teeth 168 and 170 provided on gear 112′ and on splitter/range gear 172 which is rotationally supported at the inward end 174 of output shaft 70′.

By contrasting FIGS. 3 and 4, it can be appreciated that the use of the 2 one-engaged position clutches 118 and 120 in the auxiliary transmission section 10 requires less axial displacement for operation than does the 1 two-engaged position clutch collar 162 of the prior art auxiliary transmission section 10′.

While the best mode for carrying out the invention has been described in detail, those familiar with the art to which this invention relates will recognize various alternative designs and embodiments for practicing the invention as defined by the following claims.

What is claimed is:

1. A splitter type auxiliary transmission section for a compound change gear transmission comprising an auxiliary transmission section, said auxiliary transmission section comprising a housing, a main transmission section and an auxiliary section input shaft extending into the housing and driven by the main transmission section and an output shaft extending from the housing, said auxiliary transmission section being characterized by:

a mainshaft input gear rotationally fixed to said auxiliary section input shaft;

a mainshaft splitter gear coaxial with and rotatable relative to said auxiliary section input shaft;

an output shaft range gear coaxial with and rotatable relative to said output shaft;

an auxiliary section countershaft assembly comprises an auxiliary countershaft rotationally supported in said housing, a countershaft splitter gear coaxial with and rotatable relative to said auxiliary countershaft and constantly meshed with said mainshaft input gear, a first auxiliary countershaft gear rotationally fixed to said auxiliary countershaft and constantly meshed with the mainshaft splitter gear, and a second auxiliary countershaft gear rotationally fixed to the auxiliary countershaft and constantly meshed with said output shaft range gear;

a first one engaged position splitter clutch assembly is fixed for rotation with said auxiliary section input shaft for coupling said mainshaft splitter gear with said auxiliary section input shaft;

a second one engaged position splitter clutch assembly fixed for rotation with said auxiliary section countershaft for coupling said countershaft splitter gear with said auxiliary section countershaft; and control means for alternatively positioning one of said clutch assemblies for alternatively positioning one of said clutch assemblies for engagement thereof to establish a torque flow path from said auxiliary section input shaft to the output shaft.

2. The auxiliary transmission section of claim 1 wherein the main transmission section comprises:

a main section input shaft driven by a prime mover;

an input shaft input gear rotationally fixed to said main section input shaft;

a mainshaft coaxially aligned with said main section input shaft and defining in part said auxiliary section input shaft;

two main section countershaft assemblies on diametrically opposite sides of said mainshaft;

bearings supporting said countershaft assemblies and mounted in said housing;

a plurality of main section countershaft gears fixed for rotation therewith;

a plurality of selectively clutchable mainshaft gears surrounding said mainshaft, said mainshaft gears being in engagement with said main section countershaft gears; and a plurality of sliding clutch collars for selectively engaging one of said plurality of selectively clutchable mainshaft gears to said mainshaft.

3. The auxiliary transmission of claim 1 characterized by a two-way synchronizer rotationally fitted to said output shaft for selective synchronizing engagement thereof with said output shaft range gear and auxiliary section input shaft.

4. The auxiliary transmission section of claim 3 wherein the main transmission section comprises:

a main section input shaft driven by a prime mover;

an input shaft input gear rotationally fixed to said main section input shaft;

a mainshaft coaxially aligned with said main section input shaft and defining in part said auxiliary section input shaft;

two main section countershaft assemblies on diametrically opposite sides of said mainshaft;

bearings supporting said countershaft assemblies and mounted in said housing;

a plurality of main section countershaft gears fixed for rotation therewith;

a plurality of selectively clutchable mainshaft gears surrounding said mainshaft, said mainshaft gears being in engagement with said main section countershaft gears; and a plurality of sliding clutch collars for selectively engaging one of said plurality of selectively clutchable mainshaft gears to said mainshaft.

* * * * *